United States Patent
Park et al.

(10) Patent No.: US 12,494,193 B2
(45) Date of Patent: Dec. 9, 2025

(54) METHOD FOR DETERMINING CLASSIFICATION OF A VEHICLE DOMAIN OR AN EXTERNAL DOMAIN BASED ON USER SPEECH AND A SPEECH RECOGNITION SYSTEM FOR A VEHICLE

(71) Applicants: HYUNDAI MOTOR COMPANY, Seoul (KR); KIA CORPORATION, Seoul (KR)

(72) Inventors: Sung Soo Park, Seoul (KR); Kyowoong Choo, Seoul (KR); Chang Woo Chun, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 217 days.

(21) Appl. No.: 18/076,039

(22) Filed: Dec. 6, 2022

(65) Prior Publication Data

US 2023/0178071 A1    Jun. 8, 2023

(30) Foreign Application Priority Data

Dec. 8, 2021    (KR) .......................... 10-2021-0175090

(51) Int. Cl.
  *G10L 15/08*    (2006.01)
  *G10L 15/19*    (2013.01)
  *G10L 15/26*    (2006.01)

(52) U.S. Cl.
  CPC .............. *G10L 15/08* (2013.01); *G10L 15/26* (2013.01); *G10L 2015/088* (2013.01)

(58) Field of Classification Search
  CPC ......... G10L 15/08; G10L 15/16; G10L 15/18; G10L 15/19; G10L 15/22; G10L 2015/088; G10L 15/1822; G06F 40/279; G06F 40/284; G06F 40/295; G06F 40/30
  USPC ... 704/9, 232, 236, 251, 255, 257, 270, 275, 704/270.1
  See application file for complete search history.

(56) References Cited

U.S. PATENT DOCUMENTS

| | | | |
|---|---|---|---|
| 10,418,032 B1 * | 9/2019 | Mohajer | G10L 15/1815 |
| 10,600,406 B1 * | 3/2020 | Shapiro | G10L 15/22 |
| 10,850,745 B2 * | 12/2020 | Kim | G10L 15/1822 |
| 2005/0182628 A1 * | 8/2005 | Choi | G10L 15/08 704/252 |
| 2008/0071536 A1 | 3/2008 | Nagashima | |

(Continued)

FOREIGN PATENT DOCUMENTS

| | | | |
|---|---|---|---|
| EP | 2854131 A1 * | 4/2015 | |
| EP | 3232413 A1 * | 10/2017 | |

(Continued)

*Primary Examiner* — Martin Lerner
(74) *Attorney, Agent, or Firm* — Lempia Summerfield Katz LLC

(57) ABSTRACT

A method for determining a vehicle domain includes: converting a user's speech into text; and classifying the user's speech into a vehicle domain or an external domain based on the text, wherein the classifying of the user's speech into the vehicle domain or the external domain includes classifying a domain of the user's speech based on previously stored keyword-related information and then classifying the domain of the user's speech based on previously stored keyword-related information and then classifying the domain of the user's speech based on a trained domain classification model.

19 Claims, 15 Drawing Sheets

(56) References Cited

U.S. PATENT DOCUMENTS

| | | | |
|---|---|---|---|
| 2016/0328272 A1 | 11/2016 | Ahmed et al. | |
| 2018/0261216 A1 | 9/2018 | Leeb | |
| 2019/0147869 A1* | 5/2019 | Wang | G10L 15/22 |
| | | | 704/251 |
| 2019/0164540 A1* | 5/2019 | Park | G10L 15/1822 |
| 2020/0193983 A1* | 6/2020 | Choi | G10L 15/1822 |
| 2020/0251100 A1* | 8/2020 | Tan | G06F 40/284 |
| 2020/0258514 A1* | 8/2020 | Park | G10L 15/22 |
| 2021/0125611 A1* | 4/2021 | Yu | G10L 15/1822 |
| 2021/0158800 A1 | 5/2021 | Kim | |
| 2021/0193118 A1 | 6/2021 | Lee | |
| 2021/0326104 A1* | 10/2021 | Maltsev | G10L 15/22 |
| 2022/0036886 A1* | 2/2022 | Iacobelli | G10L 15/22 |
| 2022/0139390 A1* | 5/2022 | Park | G10L 15/22 |
| | | | 704/235 |
| 2023/0267923 A1* | 8/2023 | Chun | G10L 15/1822 |
| | | | 704/235 |

FOREIGN PATENT DOCUMENTS

| | | | |
|---|---|---|---|
| EP | 4425484 A1 * | 9/2024 | G10L 15/02 |
| JP | 2006308848 A | 11/2006 | |
| KR | 20080026782 A | 3/2008 | |
| KR | 20190133931 A | 12/2019 | |
| KR | 20210064594 A | 6/2021 | |

* cited by examiner

KEYWORD-BASED DOMAIN CLASSIFICATION (1210)

SENTENCE STRUCTURE : PROPER NOUN + PREDICATE

FIG. 12

LEARNING-BASED DOMAIN CLASSIFICATION (1230)

| AREA CLASSIFICATION | INTENT CLASSIFICATION | AVAILABLE SLOT DETERMINATION |

EXTERNAL INTENT DB    VEHICLE INTENT DB

LEARNING-BASED DOMAIN CLASSIFICATION (1230)

INPUT SENTENCE : TURN ON HEAD-UP DISPLAY
INTENT : Turn on, VEHICLE CONTROL TARGET
SLOT VALUE : HEAD-UP DISPLAY INPUT SENTENCE : TURN ON BRAKE LIGHTS
INTENT : Turn on, VEHICLE CONTROL TARGET
SLOT VALUE : BRAKE LIGHTS

METHOD FOR DETERMINING CLASSIFICATION OF A VEHICLE DOMAIN OR AN EXTERNAL DOMAIN BASED ON USER SPEECH AND A SPEECH RECOGNITION SYSTEM FOR A VEHICLE

CROSS-REFERENCE TO RELATED APPLICATION

This application claims under 35 U.S.C. § 119 the benefit of priority to Korean Patent Application No. 10-2021-0175090, filed on Dec. 8, 2021 in the Korean Intellectual Property Office, the entire contents of which are incorporated herein by reference.

BACKGROUND

1. Technical Field

The disclosure relates to a method for determining a vehicle domain and relates to a speech recognition system for a vehicle that may determine a speech recognition system to process an input user's speech in an environment where a plurality of speech recognition systems may be used.

2. Description of the Related Art

A speech recognition system is capable of identifying what is intended by a user from a user's speech and providing a service corresponding to the identified user's intent.

A speech recognition system is linked to a specific device to control the device according to user's intent and also to provide specific information according to user's intent.

Such speech recognition systems may have different functions performable depending on a speech recognition system provider. Although a plurality of speech recognition systems provide the same function, the result may vary for each speech recognition system.

SUMMARY

An aspect of the disclosure provides a method for determining a vehicle domain and provides a speech recognition system for a vehicle that may, in an environment where a plurality of speech recognition systems may be used, classify an input user's speech into one of a vehicle domain, which is an object to be processed by the speech recognition system for the vehicle, or an external domain, which is an object to be processed by an external speech recognition system. The method and the system may also allow the user's speech to be processed by one of the speech recognition system for the vehicle or the external speech recognition system based on a result of the classification. Thus, the method and the system may provide a service tailored to user's intent.

Additional aspects of the disclosure are set forth, in part, in the following description and should be, in part, apparent from the description or may be learned by practice of the disclosure.

According to an embodiment of the disclosure, a method for determining a vehicle domain includes converting a user's speech into text and classifying the user's speech into a vehicle domain or an external domain based on the text. The classifying of the user's speech into the vehicle domain or the external domain includes classifying a domain of the user's speech based on previously stored keyword-related information and then classifying the domain of the user's speech based on a trained domain classification model.

When the user's speech is not classified as the external domain based on the previously stored keyword-related information, the classifying of the user's speech into the vehicle domain or the external domain includes classifying the domain of the user's speech based on the trained domain classification model.

The classifying of the user's speech into the vehicle domain or the external domain further includes adjusting a confidence value of the trained domain classification model.

The adjusting of the confidence value of the trained domain classification model uses a re-trained domain classification model to adjust the confidence value.

When the user's speech is not classified as the external domain based on the trained domain classification model, the classifying of the user's speech into the vehicle domain or the external domain re-adjusts the confidence value of the trained domain classification model.

The previously stored keyword-related information includes a vehicle-related keyword. The classifying of the domain of the user's speech based on the previously stored keyword-related information includes classifying the user's speech into the vehicle domain, when the vehicle-related keyword or a combination of the vehicle-related keywords is included in the user's speech.

The previously stored keyword-related information includes a pattern defined by a vehicle-related keyword and a predicate. The classifying of the domain of the user's speech based on the previously stored keyword-related information includes classifying the user's speech into the vehicle domain, when the defined pattern is included in the user's speech.

The previously stored keyword-related information includes a vehicle-related entity name. The classifying of the domain of the user's speech based on the previously stored keyword-related information includes classifying the user's speech into the vehicle domain, when the vehicle-related entity name is included in the user's speech.

The trained domain classification model includes an area classification model that classifies a result of sentence embedding of the text, converted from the user's speech, into a vehicle area or another area within an embedding space. The classifying of the domain of the user's speech based on the trained domain classification model includes classifying the user's speech into the external domain, when the result of sentence embedding of the text is not included in the vehicle area.

The trained domain classification model includes an intent classification model that classifies an intent of the user's speech. The classifying of the domain of the user's speech based on the trained domain classification model includes classifying the user's speech into the external domain, when the intent classified by the intent classification model is included in an external intent.

The classifying of the domain of the user's speech based on the trained domain classification model includes, when the intent classified by the intent classification model is not included in the external intent, extracting a slot value from the user's speech, and when the extracted slot value is not included in a vehicle-related slot, classifying the user's speech into the external domain.

According to an embodiment of the disclosure, a speech recognition system for a vehicle includes a speech recognition module configured to convert a user's speech into text and a domain classification module configured to classify the user's speech into a vehicle domain or an external domain based on the text. The domain classification module is configured to classify a domain of the user's speech based on previously stored keyword-related information, and then classify the domain of the user's speech based on a trained domain classification model.

When the user's speech is not classified as the external domain based on the previously stored keyword-related information, the domain classification module is configured to classify the domain of the user's speech based on the trained domain classification model.

The domain classification module is configured to adjust a confidence value of the trained domain classification model.

The domain classification module uses a re-trained domain classification model to adjust the confidence value.

When the user's speech is not classified as the external domain based on the trained domain classification model, the domain classification module is configured to re-adjust the confidence value of the trained domain classification model.

The previously stored keyword-related information includes a vehicle-related keyword. The domain classification module is configured to classify the user's speech into the vehicle domain, when the vehicle-related keyword or a combination of the vehicle-related keywords is included in the user's speech.

The previously stored keyword-related information includes a pattern defined by a vehicle-related keyword and a predicate. The domain classification module is configured to classify the user's speech into the vehicle domain, when the defined pattern is included in the user's speech.

The previously stored keyword-related information includes a vehicle-related entity name. The domain classification module is configured to classify the user's speech into the vehicle domain, when the vehicle-related entity name is included in the user's speech.

The trained domain classification model includes an area classification model that classifies a result of sentence embedding of the text, converted from the user's speech, into a vehicle area or another area within an embedding space. The domain classification module is configured to classify the user's speech into the external domain, when the result of sentence embedding of the text is not included in the vehicle area.

The trained domain classification model includes an intent classification model that classifies an intent of the user's speech. The domain classification module is configured to classify the user's speech into the external domain, when the intent classified by the intent classification model is included in an external intent.

The domain classification module is configured to extract a slot value from the user's speech, when the intent classified by the intent classification model is not included in the external intent, and classify the user's speech into the external domain, when the extracted slot value is not included in a vehicle-related slot.

BRIEF DESCRIPTION OF THE DRAWINGS

These and/or other aspects of the disclosure should become apparent and more readily appreciated from the following description of the embodiments, taken in conjunction with the accompanying drawings of which:

FIGS. 11, 12, and 13 are diagrams illustrating operations of learning-based domain classification in a method for determining a vehicle domain;

DETAILED DESCRIPTION

Figure 1:
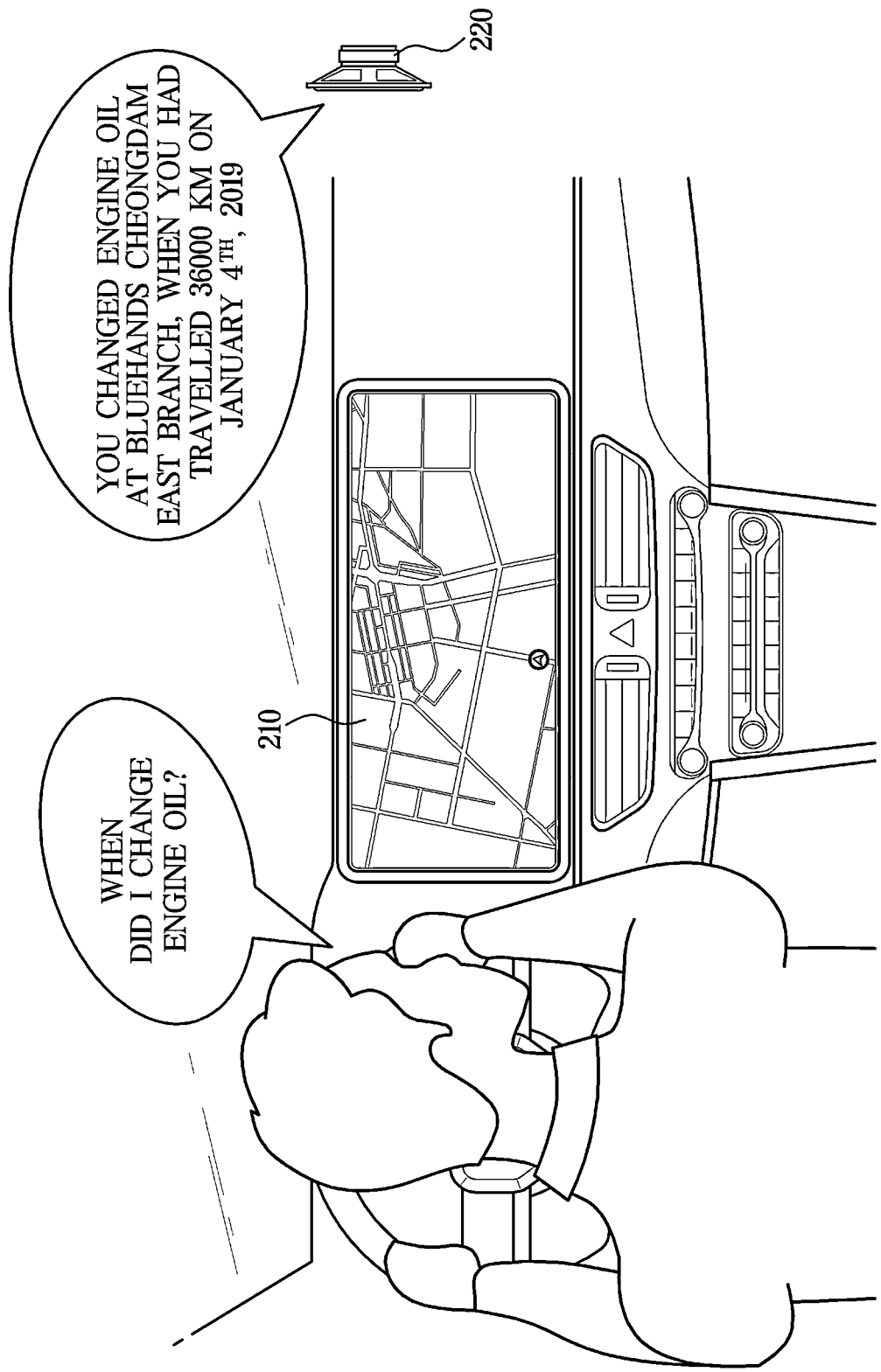
FIG. 1 is a diagram illustrating an example of dialogue between a user and a speech recognition system for a vehicle according to an embodiment.

The embodiments set forth herein and illustrated in the configuration of the disclosure are only embodiments, so it should be understood that they may be replaced with various equivalents and modifications at the time of the disclosure.

Like reference numerals throughout the specification denote like elements.

Terminologies used herein are for the purpose of describing particular embodiments only and are not intended to limit the disclosure. It should be understood that the singular forms are intended to include the plural forms as well, unless the context clearly dictates otherwise. It should be further understood that the terms "include", "comprise", and/or "have" used in this specification specify the presence of stated features, integers, steps, operations, elements, and/or components but do not preclude the presence or addition of one or more other features, integers, steps, operations, elements, components, and/or groups thereof.

It should be understood that, although the terms first, second, etc. may be used herein to describe various elements, the various elements should not be limited by these terms. For example, without departing from the technical spirit or essential features of the disclosure, a first element may be referred to as a second element, and also a second element may be referred to as a first element. Descriptions shall be understood as to include any and all combinations of one or more of the associated listed items when the items are described by using the conjunctive term "~and/or~", or the like.

Further, the terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors. When a part, device, block, member, module, or the like of the present disclosure is described as having a purpose or performing an operation, function, or the like, the part, device, block, member, module, or the like should be considered herein as being "configured to" meet that purpose or to perform that operation or function.

Reference numerals used for method steps are just used for convenience of explanation but not to limit an order of the steps. Thus, unless the context clearly dictates otherwise, the written order may be practiced otherwise.

Hereinafter, embodiments of a method of determining a vehicle domain and a speech recognition system for a vehicle according to an aspect of the disclosure are described in detail with reference to the accompanying drawings.

Figure 2:
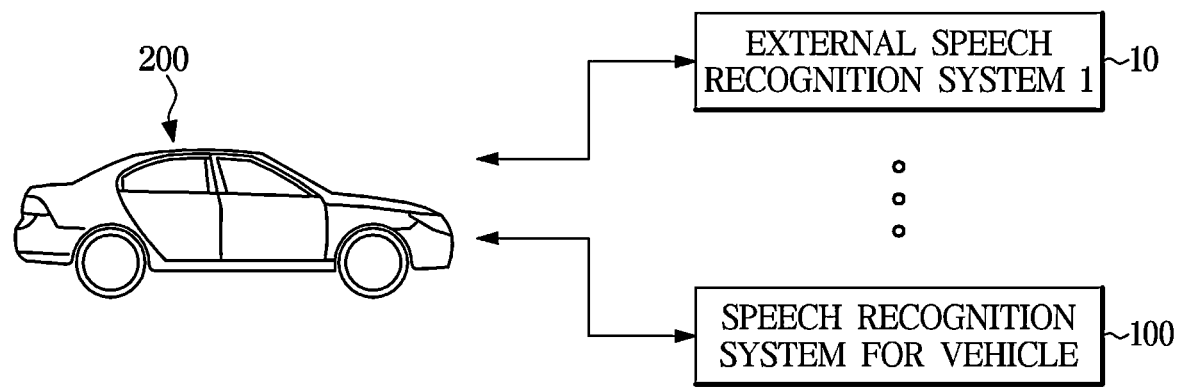
FIG. 2 is a diagram illustrating a connection relationship between an external speech recognition system and a speech recognition system for a vehicle according to an embodiment.
Figure 3:
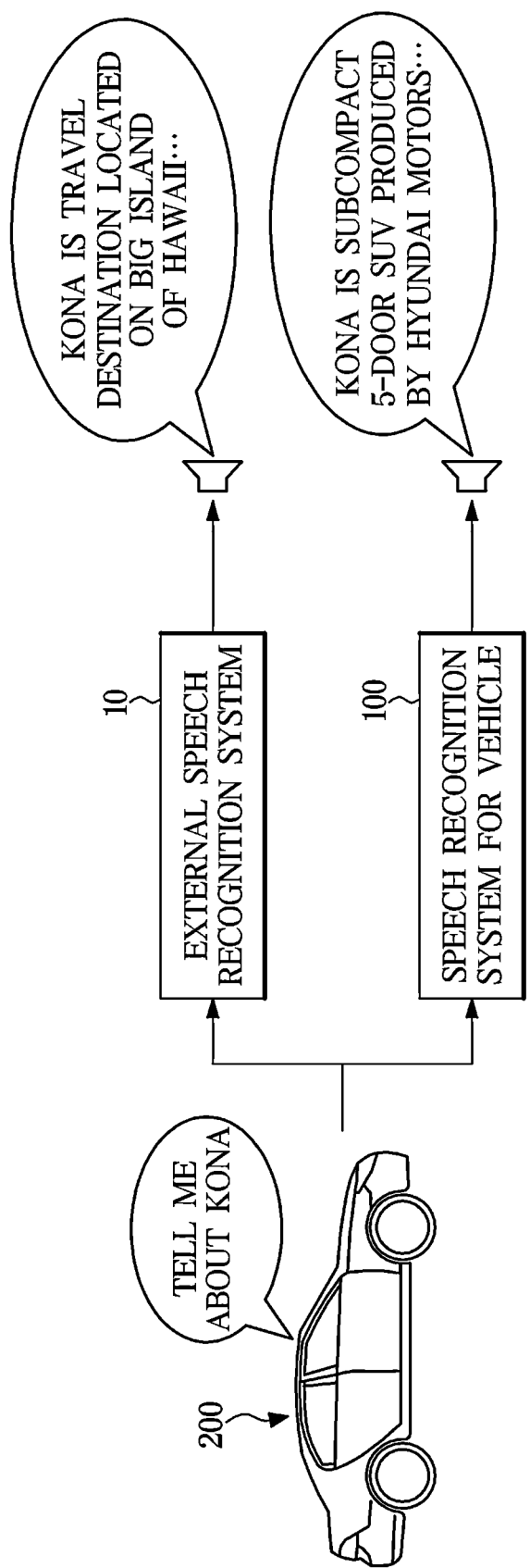
FIG. 3 is a diagram illustrating an example of processing result of an external speech recognition system and a speech recognition system for a vehicle with respect to a single user's speech.

FIG. 1 is a diagram illustrating an example of dialogue between a user and a speech recognition system for a vehicle according to an embodiment. FIG. 2 is a diagram illustrating a connection relationship between an external speech recognition system and a speech recognition system for a vehicle according to an embodiment. FIG. 3 is a diagram illustrating an example of processing result of an external speech recognition system and a speech recognition system for a vehicle with respect to a single user's speech.

Referring to FIGS. 1 and 2, a speech recognition system for a vehicle 100 according to an embodiment is linked to a vehicle 200 and may provide a service corresponding to user's intent by processing a speech of a user of the vehicle 200, i.e., a driver or an occupant.

For example, when an input user's speech is "when did I change engine oil?", the speech recognition system for the vehicle 100 may output a response such as "you changed engine oil at Bluehands Cheongdam East branch, when you had travelled 36000 km on January 4$^{th}$, 2019".

The user's speech may be input through a microphone provided in the vehicle 200, and also the response of the speech recognition system for the vehicle 100 may be output audibly through a speaker 220 provided in the vehicle 200 or visually through a display 210 provided in the vehicle 200.

As another example, when the input user's speech is "what is autohold?", the speech recognition system for the vehicle 100 may output a response such as "an autohold is a function that holds a vehicle stopped, even when you take your foot off the brake pedal".

Meanwhile, the vehicle 200 may be linked to a speech recognition system 10 operated by another provider, in addition to the speech recognition system for the vehicle 100. For convenience of description, other speech recognition systems 10 other than the speech recognition system for the vehicle 100 are referred to as an 'external speech recognition system'.

According to the embodiment, linking a speech recognition system to the vehicle 200 may refer to a state where a user's speech input through the vehicle 200 may be transmitted to the speech recognition system 100, and a result of processing the user's speech in the speech recognition system 100 may be transmitted to the vehicle 200.

Alternatively, a medium between a user and the speech recognition system 100 may be a mobile device such as a smartphone, a wearable device, or the like, other than the vehicle 200. In this case, a user's speech input through the mobile device may be transmitted to the speech recognition system 100 and a processing result of the speech recognition system 100 may be output through the mobile device.

In the embodiment described below, an example where the vehicle 200 is a medium between the user and the speech recognition system 100 is described for detailed description.

The speech recognition system for the vehicle 100 and the external speech recognition system 10 may have different functions specialized for each speech recognition system, and the same functions. Even among the same functions, however, functions that output different results according to characteristics of each speech recognition system may exist.

For example, as shown in FIG. 3, when the input user's speech is "tell me about Kona", a domain corresponding to the user's speech is [information retrieval], and both the speech recognition system for the vehicle 100 and the external speech recognition system 10 may process the corresponding domain.

When the user's speech is processed by the external speech recognition system 10, the external speech recognition system 10 may recognize "Kona" as a name of a place and output a response such as "Kona is a travel destination located on the Big Island of Hawaii . . . ".

When the user's speech is processed by the speech recognition system for the vehicle 100, the speech recognition system for the vehicle 100 may recognize "Kona" as an automotive brand name and output a response such as "Kona is a subcompact 5-door SUV produced by Hyundai Motors . . . ".

In other words, with respect to the same input, the processing results may be different depending on a speech recognition system that processes. Accordingly, an input user's speech is required to be processed by a speech recognition system capable of performing optimal processing tailored to user's intent.

To this end, the speech recognition system for the vehicle 100 according to an embodiment may determine whether the user's speech is to be processed by the speech recognition system for the vehicle 100 or the external speech recognition system 10. When it is determined that the user's speech is to be processed by the speech recognition system for the vehicle 100, the speech recognition system for the vehicle 100 may process the user's speech by itself. When it is determined that the user's speech is to be processed by the external speech recognition system 10, the speech recognition system for the vehicle 100 may transmit the user's speech to the external speech recognition system 10.

Figure 4:
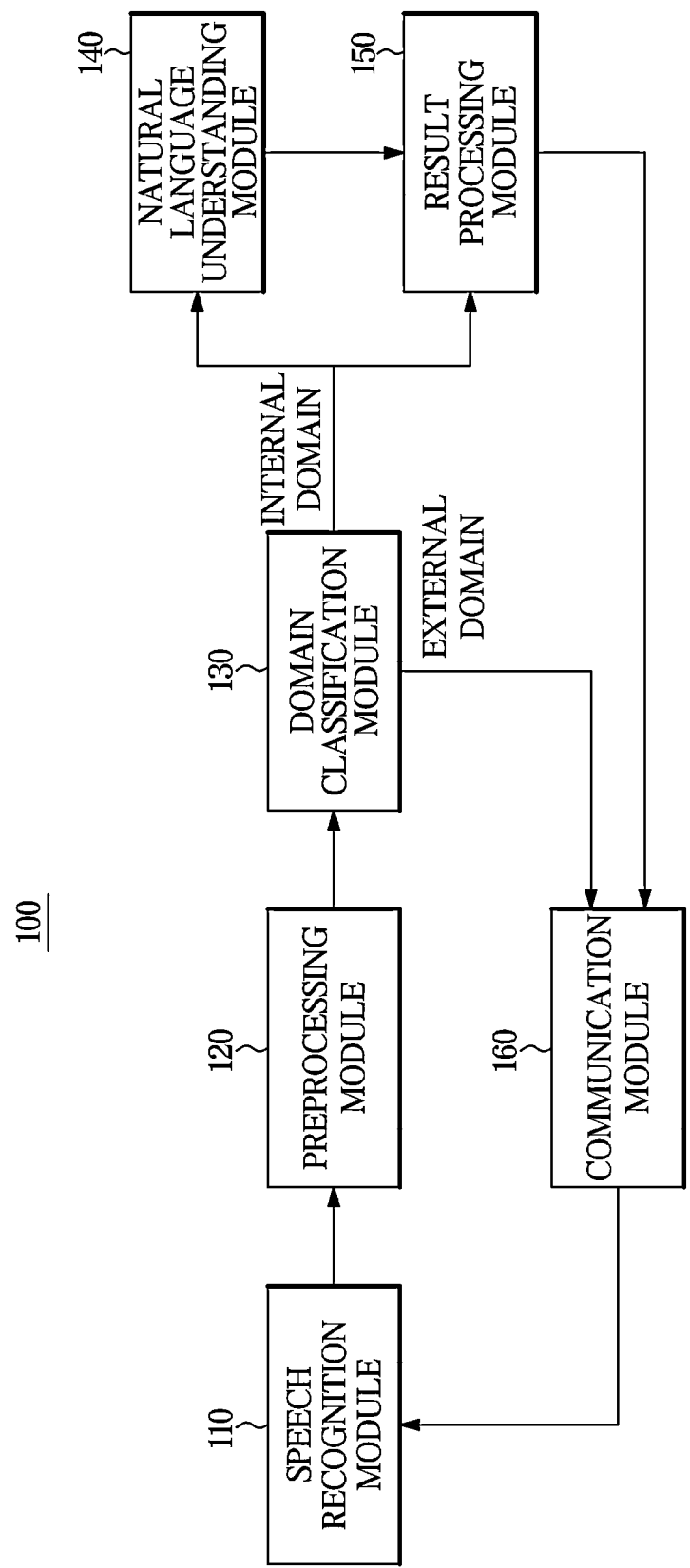
FIG. 4 is a control block diagram illustrating a speech recognition system for a vehicle according to an embodiment.
Figure 5:
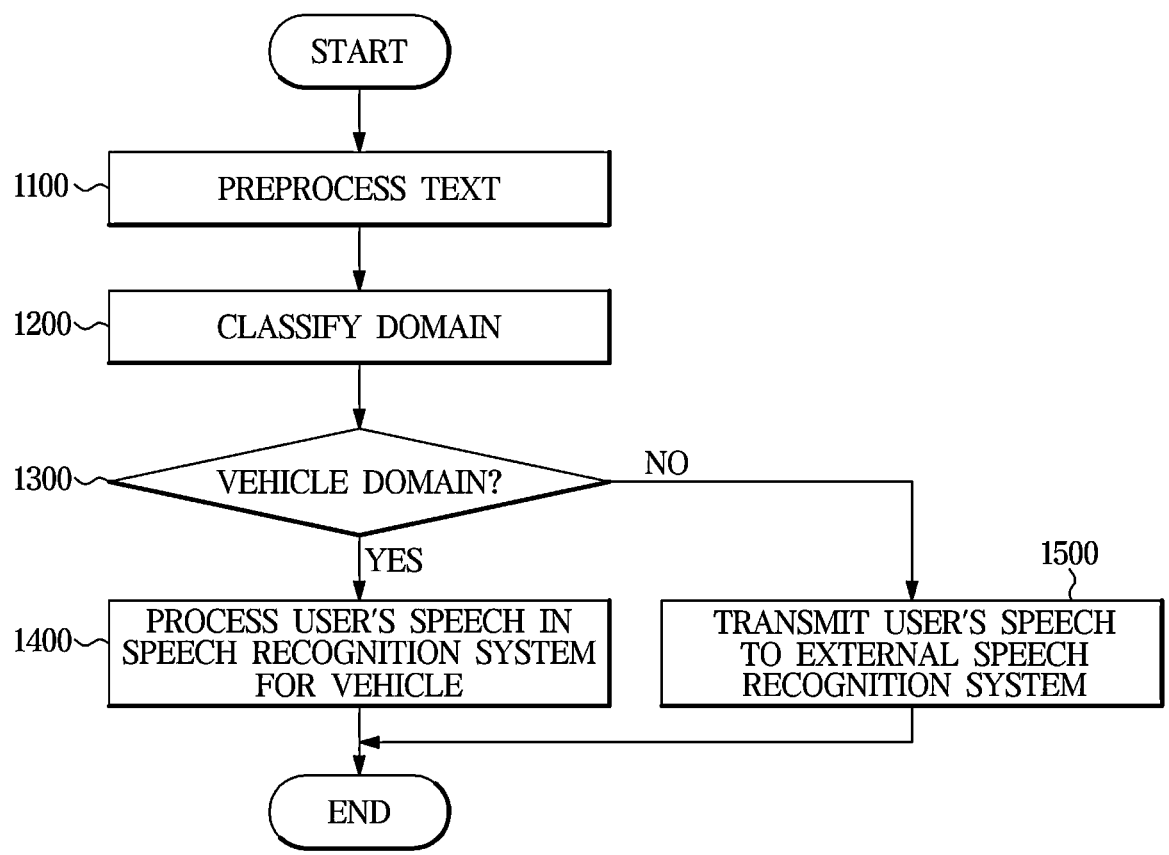
FIG. 5 is a flowchart illustrating a method for determining a vehicle domain according to an embodiment.

FIG. 4 is a control block diagram illustrating a speech recognition system for the vehicle according to an embodiment. FIG. 5 is a flowchart illustrating a method for determining a vehicle domain according to an embodiment.

A method for determining a vehicle domain according to an embodiment may be performed by the speech recognition system for the vehicle 100 according to an embodiment. Therefore, a description of the method for determining a vehicle domain is equally applicable to the speech recognition system for the vehicle 100, and a description of the speech recognition system for the vehicle 100 is also equally applicable to the method for determining a vehicle domain.

Referring to FIG. 4, according to an embodiment, the speech recognition system for the vehicle 100 includes a speech recognition module 110, a preprocessing module 120, a domain classification module 130, a natural language understanding module 140, a result processing module 150, and a communication module 160. The speech recognition module 110 converts an input user's speech into text, and the preprocessing module 120 performs preprocessing so that the text may be input to the domain classification module 130. The domain classification module 130 classifies the user's speech into one of a vehicle domain or an external domain based on the text. When the user's speech is classified as the vehicle domain, the natural language understanding module 140 and the result processing module 150 process the user's speech and provide a service corresponding to user's intent. The communication module 160 transmits and receives a signal with the vehicle 200 or the external speech recognition system 10.

When the user's speech is input through a microphone provided in the vehicle 200, the input user's speech may be transmitted to the communication module 160 in a form of speech signal. The communication module 160 may include a wireless communication module for transmitting and receiving a signal with a remote electronic device such as a 3G communication module, a 4G communication module, a 5G communication module, wi-fi, and the like.

The speech recognition module 110 may be implemented as a speech to text (STT) engine and convert a user's speech, which is a speech signal, into text by applying the user's speech to a speech recognition algorithm.

For example, the speech recognition module 110 may extract a feature vector by applying a feature vector extraction technology such as a cepstrum, a linear predictive coefficient (LPC), a Mel frequency cepstral coefficient (MFCC), a filter bank energy, or the like.

Also, a recognition result may be obtained by comparing the extracted feature vector and a trained reference pattern. To this end, an acoustic model that models and compares signal characteristics of speech or a language model that models a sequence relationship of a recognition vocabulary such as a word or a syllable may be used.

In addition, the speech recognition module 110 may convert the user's speech into the text based on learning where deep learning or machine learning is applied.

The natural language understanding module 140 may apply a natural language understanding (NLU) technology to determine user's intent included in the user's speech. The user's speech processed in the natural language understanding module 140 refers to the text input by being converted by the speech recognition module 110, i.e., an input sentence.

The natural language understanding module 140 may extract information, such as a domain, an entity name, a speech act, etc., from the user's speech and recognize intent and an entity required for performing the corresponding intent based on the extracted information.

For example, when an input sentence is "let's go home", a domain may be [navigation], an intent may be [set. route], and an entity required for performing control corresponding to the corresponding intent may be [starting point, destination].

As another example, when an input sentence is "turn on an air conditioner", a domain may be [vehicle control], an intent may be [turn on. air conditioner], and an entity required for performing control corresponding to the corresponding intent may be [temperature, air volume].

The result processing module 150 may output a result processing signal to the vehicle 200 or an external server to perform processing for providing a service corresponding to user's intent. For instance, when the service corresponding to user's intent is a vehicle-related control, a control signal for performing the corresponding control may be generated and transmitted to the vehicle.

Alternatively, when the service corresponding to user's intent is to provide specific information, the information may be retrieved and transmitted to a user terminal. As required, information retrieval may be performed in another external server.

Alternatively, when the service corresponding to user's intent is to provide specific content, the result processing module 150 may request the content from an external server that provides the content.

Alternatively, when the service corresponding to user's intent is to simply continue a dialogue, the result processing module 150 may generate a response to the user's speech and output the response audibly.

Operations of the preprocessing module 120 and the domain classification module 130 are described below.

The above-described speech recognition system for the vehicle 100 may be implemented with at least one memory storing a program performing the aforementioned operations and at least one processor implementing a stored program.

Constituent components of the speech recognition system for the vehicle 100 are divided by their operations or functions, and all or a portion of the constituent components may share a memory or processor.

The speech recognition system for the vehicle 100 may be implemented in a form of a server, but a portion of the constituent components thereof may be mounted on the vehicle 200 or a user terminal. Alternatively, the speech recognition system for the vehicle 100 may be entirely mounted on the vehicle 200 or a user terminal.

Hereinafter, operations of classifying an input user's speech into a vehicle domain or an external domain is described with reference to FIGS. 4 and 5.

Referring to FIG. 5, in the method for determining a vehicle domain according to an embodiment, preprocessing is performed with respect to text converted from a user's speech (1100).

Here, the preprocessing is for normalizing the converted text into a form that may be processed by the domain classification module 130. The preprocessing module 120 may perform spacing correction on the text and perform Korean-English correction according to a language used in an input user's speech. For example, the spacing correction and the Korean-English correction may be performed based on a pre-defined dictionary.

The text where the spacing correction and the Korean-English correction are performed may be divided into tokens. A token is a small unit for analysis. According to the embodiment, morphological analysis may be performed to separate the text into morpheme-unit tokens.

According to morphological analysis, an input sentence may be divided into morphemes. The morpheme represents the smallest unit of meaning that may no longer be analyzed. The morpheme may be a word or a part of word indicating a grammatical or relational meaning and include a root or ending of a simple word, postposition, prefix, suffix, and the like.

In Korean morphological analysis, a process of dividing a phrase based on spacing, separating a postposition from each phrase, and then dividing into a stem and an ending may be performed. However, since a single word is sometimes used with multiple meanings, a morpheme dictionary may be used to prevent the morphological analysis from being incorrect due to ambiguity. Also, part-of-speech tagging may be performed for each morpheme.

The pre-processed text may be input to the domain classification module 130.

The domain classification module 130 classifies the user's speech into one of a vehicle domain or an external domain based on the input text (1200).

According to the embodiment, the vehicle domain and the external domain are domains in a higher level than a domain classified through natural language understanding technology. The user's speech classified as the vehicle domain refers to that it is determined that the user's speech is to be processed by the speech recognition system for the vehicle 100. The user's speech classified as the external domain refers to that it is determined that the user's speech is to be processed by the external speech recognition system 10.

When the user's speech is classified as the vehicle domain (Yes in operation 1300), the user's speech is processed in the speech recognition system for the vehicle 100 (1400), and when the user's speech is classified as the external domain (No in operation 1300), the user's speech is transmitted to the external speech recognition system 10 (1500).

In order for the user's speech to be processed in the speech recognition system for the vehicle 100, the text converted from the user's speech may be input to the natural language understanding module 140. The text input to the natural language understanding module 140 may be the text preprocessed in operation 1100.

Also, information acquired during domain classification, such as an entity name recognition, intent recognition, slot recognition, or the like, may be used in the natural language understanding module 140 or the result processing module 150.

In addition, when all the information to be acquired in the natural language understanding module 140, such as a domain, intent, entity, etc., is obtained in the domain classification module 130, the obtained information may be directly input to the result processing module 150.

Meanwhile, in the above-described embodiment, although the single external speech recognition system 10 is described, two or more external speech recognition systems 10 linked to the vehicle 200, other than the speech recognition system for the vehicle 100, may exist. For example, when two external speech recognition systems 10 linked to the vehicle 200 exist, a user's speech may be classified as one of a vehicle domain, a first external domain, or a second external domain by domain classification operations, which is described below.

Although operations 1400 and 1500 are illustrated in the flowchart of FIG. 5 to describe processes after domain classification, the method for determining a vehicle domain according to an embodiment may not include operations 1400 and 1500. Also, preprocessing of text may not be included in the method for determining a vehicle domain according to an embodiment.

Figure 6:
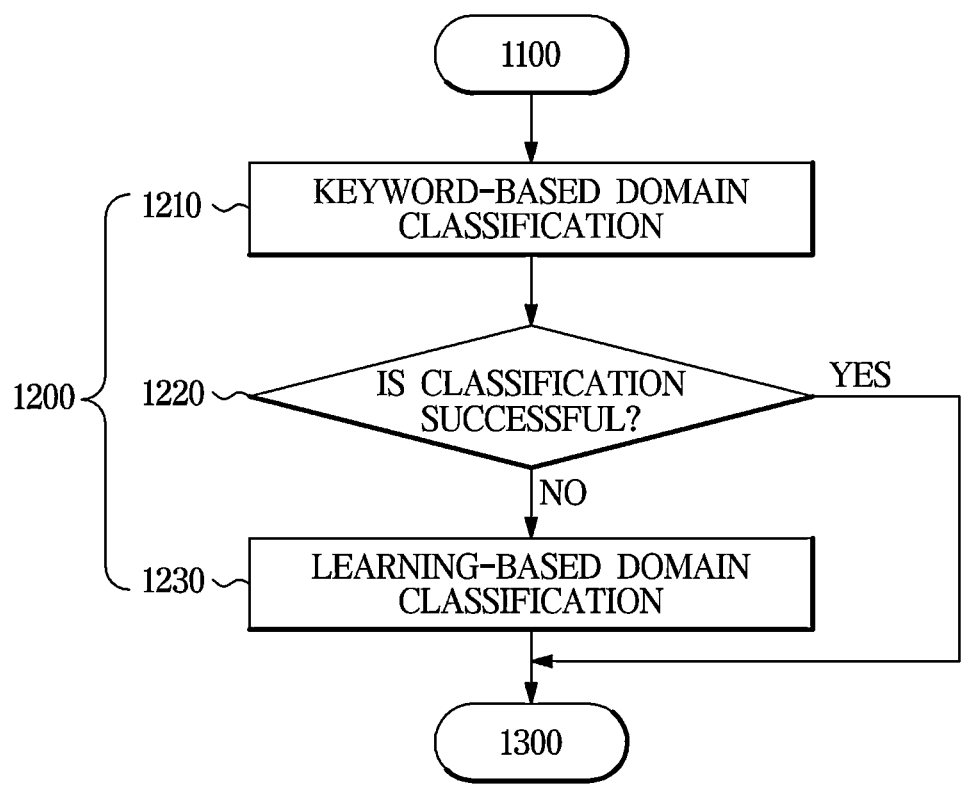
FIG. 6 is a flowchart illustrating operations of classifying a domain in a method for determining a vehicle domain according to an embodiment.

FIG. 6 is a flowchart illustrating operations of classifying a domain in a method for determining a vehicle domain according to an embodiment.

Referring to FIG. 6, to classify a domain (1200), a keyword-based domain classification may be performed (1210). When the domain is successfully classified by the keyword-based domain classification (Yes in operation 1220), depending on whether the classified domain is the vehicle domain or the external domain (1300), operation 1400 or operation 1500 may be performed.

When the domain is not successfully classified by the keyword-based domain classification (No in operation 1220), a learning-based domain classification may be performed (1230).

In other words, the keyword-based domain classification and the learning-based domain classification are sequentially performed, but when the domain classification is successfully made by the keyword-based domain classification, the domain classification may end without performing the learning-based domain classification.

FIGS. 7-10 are diagrams illustrating operations of keyword-based domain classification in a method for determining a vehicle domain according to an embodiment.

In the keyword-based domain classification (1210), a domain of the user's speech may be classified based on previously stored keyword-related information.

For the keyword-based domain classification (1210), at least one of a keyword recognition, pattern recognition, or entity name recognition may be performed. According to the embodiment, it is described as an example that the keyword recognition, pattern recognition, and entity name recognition are sequentially performed.

Figure 7:
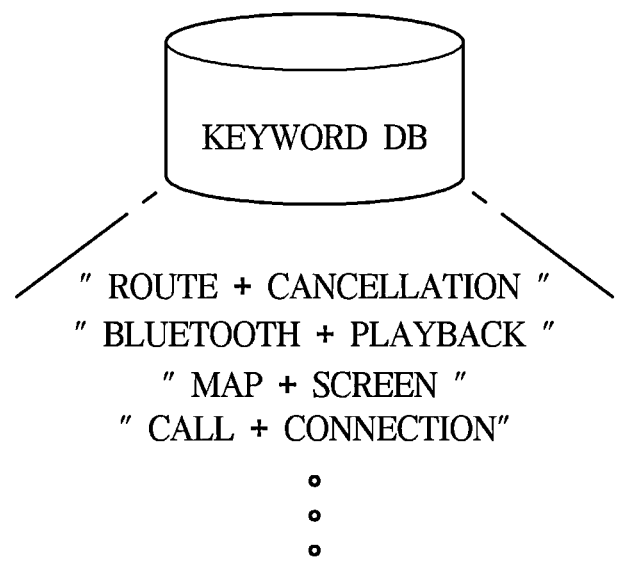
FIGS. 7-10 are diagrams illustrating operations of keyword-based domain classification in a method for determining a vehicle domain according to an embodiment.

Referring to FIG. 7, the previously stored keyword-related information may include a vehicle-related keyword that may be stored in a keyword database (DB) in a memory. For example, a vehicle-related keyword, such as a route, Bluetooth, radio, call, map, screen, cancellation, connection, playback, and the like, may be stored in the keyword DB.

When a sentence structure of the user's speech includes "noun+noun" and a combination of vehicle-related keywords stored in the keyword DB are included in the user's speech, the user's speech may be classified as the vehicle domain.

For example, when the user's speech includes a combination of vehicle-related keywords stored in the keyword DB, such as "route+cancellation", "Bluetooth+playback", "map+screen", or "call+connection", the user's speech may be classified as the vehicle domain.

Figure 8:
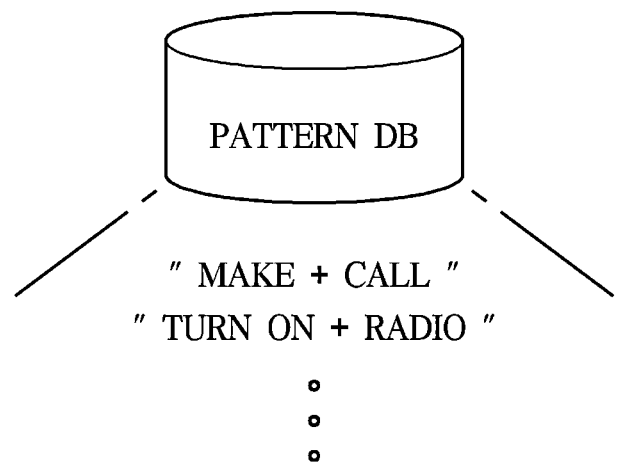

Referring to FIG. 8, the previously stored keyword-related information may include a pattern defined by a vehicle-related keyword and a predicate that may be stored in a pattern DB in the memory. For example, a pre-defined pattern, such as "make+call" and "turn on+radio", may be stored in the pattern DB. The pattern may be generated from a plurality of sample sentences classified as the vehicle domain.

When a sentence structure of the user's speech includes "predicate+noun", the domain classification module 130 determines whether a pattern stored in the pattern DB is included in the user's speech.

When the previously stored pattern is included in the user's speech, the domain classification module 130 may classify the user's speech into the vehicle domain.

Figure 9:
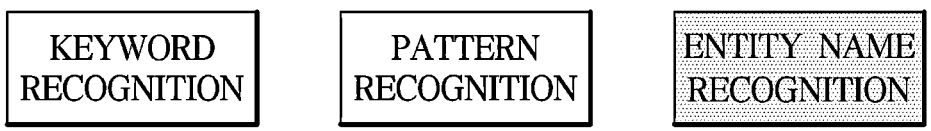
Figure 9:
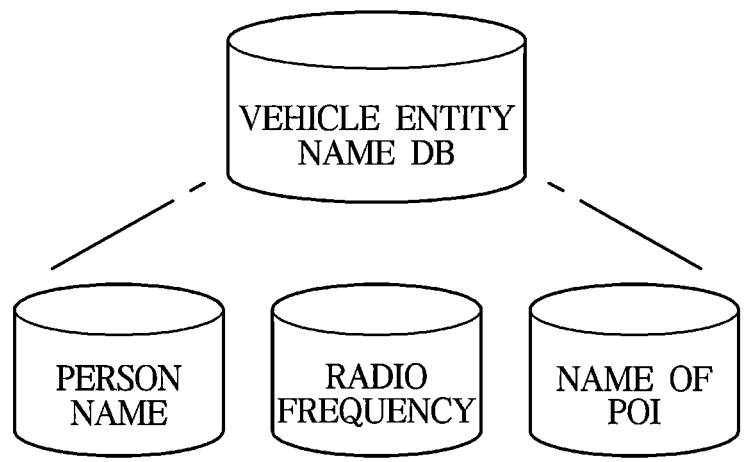

Referring to FIG. 9, the previously stored keyword-related information may include a vehicle-related entity name that may be stored in a vehicle entity name DB. For example, the vehicle entity name DB may include a person name DB, a radio frequency number DB, or point of interest (POI) name DB.

When a sentence structure of the user's speech includes "proper noun+predicate" and a proper noun included in the user's speech corresponds to the vehicle-related entity name stored in the vehicle entity name DB, the domain classification module 130 may classify the user's speech into the vehicle domain.

Figure 10:
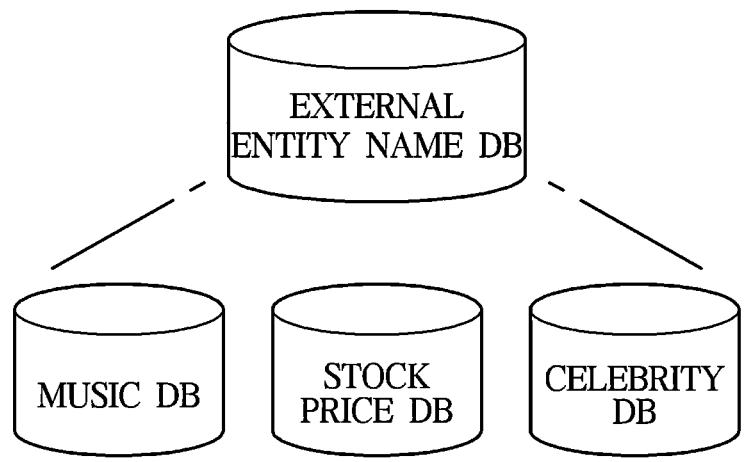

Referring to FIG. 10, the previously stored keyword-related information may include an entity name related to a service provided by the external speech recognition system 10, i.e., an external entity name, and the external entity name may be stored in an external entity name DB. For example, the external entity name DB may include a music DB, stock price DB, or celebrity DB.

When a sentence structure of the user's speech includes "proper noun+predicate" and a proper noun included in the user's speech corresponds to the external entity name stored in the external entity name DB, the domain classification module 130 may classify the user's speech into the external domain.

Meanwhile, the keyword recognition, the pattern recognition, and the entity name recognition may be sequentially performed. For instance, when a domain is classified by the keyword recognition, the domain classification may end, and when the domain is not classified, the pattern recognition may be performed. Also, when the domain is classified by the pattern recognition, the domain classification may end, and when the domain is not classified, the entity name recognition may be performed.

In the entity name recognition, whether the vehicle-related entity name is included may be determined first. When the vehicle-related entity name is not included, whether the external entity name is included may be determined.

When the domain classification fails even after performing the entity name recognition (No in operation 1220), the learning-based domain classification may be performed (1230).

Figure 11:
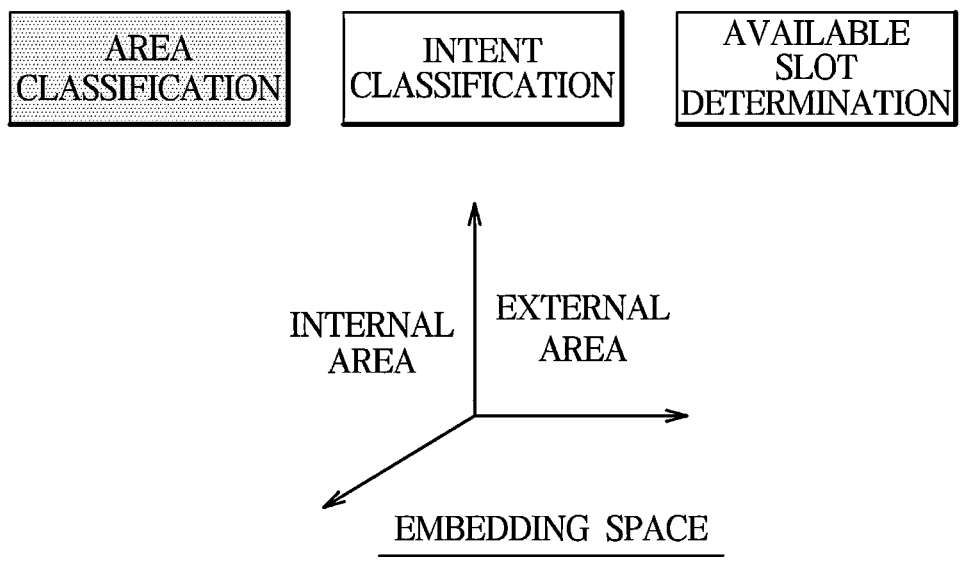
Figure 13:
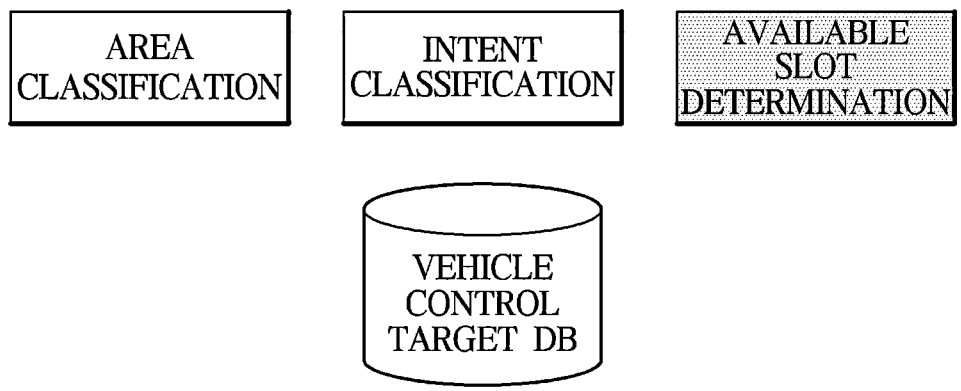

FIGS. 11, 12, and 13 are diagrams illustrating operations of learning-based domain classification in a method for determining a vehicle domain.

In the learning-based domain classification (1230), a domain of the user's speech may be classified based on a trained domain classification model.

For the learning-based domain classification (1230), at least one of area classification, intent classification, or available slot determination may be performed. According to the embodiment, it is described as an example that the area classification, the intent classification, and the available slot determination are sequentially performed.

Referring to FIG. 11, the trained domain classification model may include an area classification model that determines whether a result of sentence embedding of the text converted from the user's speech is included in a vehicle area within an embedding space. When the result of sentence embedding is not included in the vehicle area, the domain classification module 130 may classify the user's speech into an external domain.

In a natural language processing, embedding refers to a result or a process of converting a natural language into a vector. In other words, through embedding, a word or sentence may be converted into a vector and projected on a vector space or embedding space. Sentence embedding refers to representing an entire sentence as a point in the vector space or embedding space.

In the embedding space, similar words or sentences may be grouped together, and a distance between vectors may be calculated to determine a degree of similarity. The embedding space may be created by learning a large amount of corpus.

Referring to FIG. 12, the trained domain classification model may include an intent classification model that classifies intent of the user's speech. When the result of sentence embedding is included in the vehicle area, the domain classification module 130 may classify the intent of the user's speech based on the intent classification model.

To this end, vehicle-related intent may be stored in a vehicle intent DB and external intent may be stored in an external intent DB. The vehicle-related intent may include intent that may be processed by the speech recognition system for the vehicle 100 or mainly processed in the speech recognition system for the vehicle 100. The external intent may include intent that may be processed by the external speech recognition system 10 or mainly processed in the external speech recognition system 10. For example, intent like [search. weather] or [search. music] may be classified as the external intent.

When the intent classified by the intent classification model is included in the external intent, the domain classification module 130 may classify the user's speech into the external domain.

When the intent classified by the intent classification model is not included in the external intent, the domain classification module 130 may extract a slot value from the user's speech, as shown in FIG. 13.

A slot represents meaningful information related to intent included in a speech. The slot may be defined by a type indicating a group to which its value belongs, a role in a sentence, and a value. An entity may be used to fill a slot.

When the slot value extracted from the user's speech is not included in a vehicle control target, the domain classification module 130 may classify the user's speech into the external domain. The vehicle control target may include components of vehicle or components controllable in the vehicle and may be stored in a vehicle control target DB.

As shown in FIG. 13, when the user's speech is "turn on a head-up display", an intent is [turn on. vehicle control target], and a slot value is a head-up display. When the user's speech is "turn on brake lights", an intent is [turn on. vehicle control target], and a slot value is brake lights.

Here, since the slot value extracted from the user's speech is included in the vehicle control target DB, the domain classification module 130 does not classify the user's speech into the external domain in the embodiment.

Figure 14:
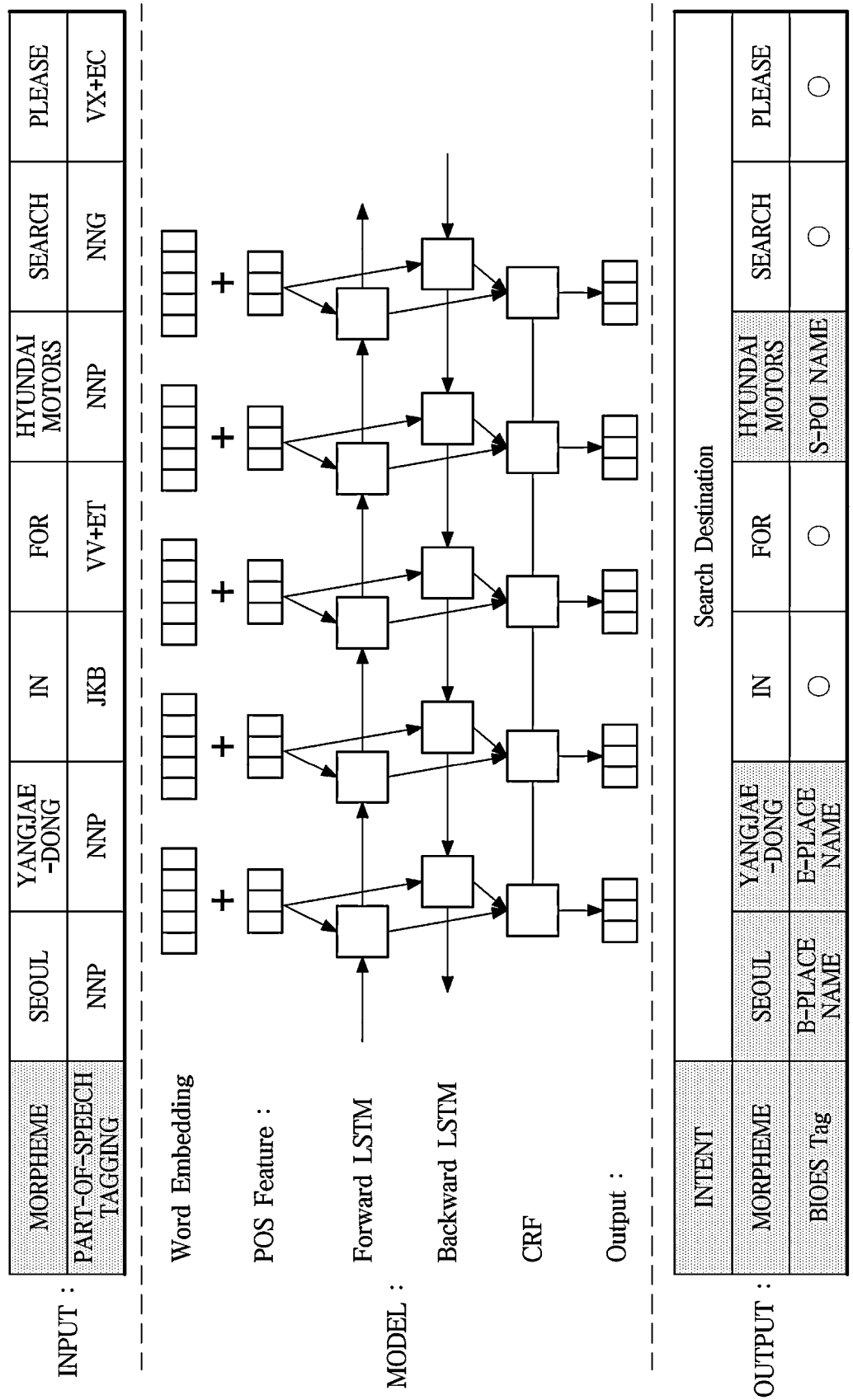
FIG. 14 is a schematic diagram illustrating a structure of a trained domain classification model used in a method for determining a vehicle domain according to an embodiment.

FIG. 14 is a schematic diagram illustrating a structure of a trained domain classification model used in a method for determining a vehicle domain according to an embodiment.

A trained domain classification model according to the disclosure may be a model capable of extracting intent or a slot from an input sentence by training both a sentence and intent or slot of the sentence by a deep learning algorithm.

According to an embodiment of FIG. 14, a forward long short term memory (forward LSTM) and backward LSTM, which are a class of a recurrent neural network (RNN), may be used to implement an encoding layer, and an entity name may be recognized by a conditional random field (CRF) layer.

However, a structure of the domain classification model of FIG. 14 is simply an example applicable to the method of for determining a vehicle domain, and other domain classification models having various structures may be used.

Meanwhile, when the slot value extracted from the user's speech is included in the vehicle control target DB, the domain classification module 130 may perform an operation of re-adjusting a confidence value.

Figure 15:
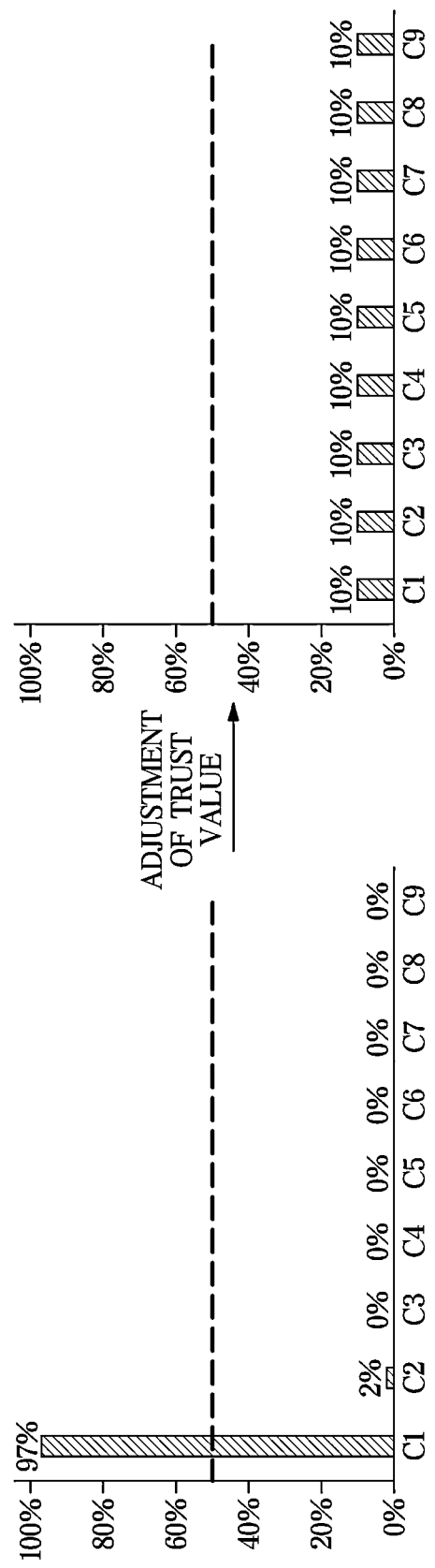
FIG. 15 is a graph illustrating operations of re-adjusting a confidence value in a method for determining a vehicle domain according to an embodiment.

FIG. 15 is a graph illustrating operations of re-adjusting a confidence value in a method for determining a vehicle domain according to an embodiment.

As shown in a left graph of FIG. 15, learning-based data classification is likely to have a high confidence value for unknown data c1 and output an incorrect result. The method for determining a vehicle domain according to an embodiment may have a process of verifying again whether a user's speech is to be classified as a vehicle domain by considering the above-described characteristics of the trained domain classification model.

To this end, by applying a new loss function to the already trained domain classification model, re-training may be performed so that even distribution of confidence value may be output with respect to unknown data, as shown in a right graph of FIG. 15.

When the slot value extracted from the user's speech is included in the vehicle control target DB, the domain classification module 130 may obtain an adjusted confidence value from the domain classification model re-trained for adjusting the confidence value. When the adjusted confidence value exceeds a threshold value, the domain classification module 130 may finally classify the user's speech into the vehicle domain (Yes in operation 1300). When the adjusted confidence value is less than or equal to the threshold value, the domain classification module 130 may classify the user's speech into the external domain (No in operation 1300).

As is apparent from the above, according to the embodiments of the disclosure, in an environment where a plurality of speech recognition systems may be used, the method for determining a vehicle domain and the speech recognition system for the vehicle can classify an input user's speech into one of a vehicle domain, which is an object to be processed by the speech recognition system for the vehicle, or an external domain, which is an object to be processed by an external speech recognition system. The method for determining a vehicle domain and the speech recognition system for the vehicle can also allow the user's speech to be processed by one of the speech recognition system for the vehicle or the external speech recognition system based on a result of the classification. Thus, the method for determining a vehicle domain and the speech recognition system for the vehicle can provide a service tailored to user's intent.

A method for determining a vehicle domain according to embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented in a non-transitory manner as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those having ordinary skill in the art should appreciate that various modifications, additions, and substitutions are possible, without departing from the scope and spirit of the disclosure. Therefore, embodiments have not been described for limiting purposes.

What is claimed is:

1. A method for determining a vehicle domain, the method comprising:
   converting a user's speech into text; and
   classifying the user's speech into a vehicle domain or an external domain based on the text,
   wherein the classifying of the user's speech into the vehicle domain or the external domain comprises classifying a domain of the user's speech based on previously stored keyword-related information and then classifying the domain of the user's speech based on a trained domain classification model,
   wherein the trained domain classification model comprises an intent classification model configured to classify an intent of the user's speech, and
   wherein the classifying of the domain of the user's speech based on the trained domain classification model comprises:
   when the intent classified by the intent classification model is not included in an external intent, extracting a slot value from the user's speech, and
   when the extracted slot value is not included in a vehicle-related slot, classifying the user's speech into the external domain.

2. The method of claim 1, wherein when the user's speech is not classified into the external domain based on the previously stored keyword-related information, the classifying of the user's speech into the vehicle domain or the external domain comprises classifying the domain of the user's speech based on the trained domain classification model.

3. The method of claim 2, wherein the classifying of the user's speech into the vehicle domain or the external domain further comprises adjusting a confidence value of the trained domain classification model.

4. The method of claim 3, wherein the adjusting of the confidence value of the trained domain classification model uses a re-trained domain classification model to adjust the confidence value.

5. The method of claim 3, wherein when the user's speech is not classified into the external domain based on the trained domain classification model, the classifying of the user's speech into the vehicle domain or the external domain re-adjusts the confidence value of the trained domain classification model.

6. The method of claim 1, wherein the previously stored keyword-related information includes a vehicle-related keyword, and
   wherein the classifying of the domain of the user's speech based on the previously stored keyword-related information comprises classifying the user's speech into the vehicle domain, when the vehicle-related keyword or a combination of the vehicle-related keywords is included in the user's speech.

7. The method of claim 1, wherein the previously stored keyword-related information includes a pattern defined by a vehicle-related keyword and a predicate, and
   wherein the classifying of the domain of the user's speech based on the previously stored keyword-related information comprises classifying the user's speech into the vehicle domain, when the defined pattern is included in the user's speech.

8. The method of claim 1, wherein the previously stored keyword-related information includes a vehicle-related entity name, and
   wherein the classifying of the domain of the user's speech based on the previously stored keyword-related information comprises classifying the user's speech into the vehicle domain, when the vehicle-related entity name is included in the user's speech.

9. The method of claim 1, wherein the trained domain classification model comprises an area classification model that classifies a result of sentence embedding of the text, converted from the user's speech, into a vehicle area or another area within an embedding space, and
   wherein the classifying of the domain of the user's speech based on the trained domain classification model comprises classifying the user's speech into the external domain, when the result of sentence embedding of the text is not included in the vehicle area.

10. The method of claim 1,
    wherein the classifying of the domain of the user's speech based on the trained domain classification model comprises classifying the user's speech into the external domain, when the intent classified by the intent classification model is included in the external intent.

11. A speech recognition system for a vehicle, comprising:
a speech recognition module configured to convert a user's speech into text; and
a domain classification module configured to classify the user's speech into a vehicle domain or an external domain based on the text,
wherein the domain classification module is configured to classify a domain of the user's speech based on previously stored keyword-related information, and then classify the domain of the user's speech based on a trained domain classification model,
wherein the trained domain classification model comprises an intent classification model configured to classify an intent of the user's speech, and
wherein to classify the domain of the user's speech based on the trained domain classification model, the domain classification module is configured to:
when the intent classified by the intent classification model is not included in an external intent, extract a slot value from the user's speech, and
when the extracted slot value is not included in a vehicle-related slot, classify the user's speech into the external domain.

12. The speech recognition system for the vehicle of claim 11, wherein when the user's speech is not classified into the external domain based on the previously stored keyword-related information, the domain classification module is configured to classify the domain of the user's speech based on the trained domain classification model.

13. The speech recognition system for the vehicle of claim 12, wherein the domain classification module is configured to adjust a confidence value of the trained domain classification model.

14. The speech recognition system for the vehicle of claim 13, wherein the domain classification module uses a re-trained domain classification model to adjust the confidence value.

15. The speech recognition system for the vehicle of claim 13, wherein when the user's speech is not classified into the external domain based on the trained domain classification model, the domain classification module is configured to re-adjust the confidence value of the trained domain classification model.

16. The speech recognition system for the vehicle of claim 11, wherein the previously stored keyword-related information includes a vehicle-related keyword, and
wherein the domain classification module is configured to classify the user's speech into the vehicle domain, when the vehicle-related keyword or a combination of the vehicle-related keywords is included in the user's speech.

17. The speech recognition system for the vehicle of claim 11, wherein the previously stored keyword-related information includes a pattern defined by a vehicle-related keyword and a predicate, and
wherein the domain classification module is configured to classify the user's speech into the vehicle domain, when the defined pattern is included in the user's speech.

18. The speech recognition system for the vehicle of claim 11, wherein the previously stored keyword-related information includes a vehicle-related entity name, and
wherein the domain classification module is configured to classify the user's speech into the vehicle domain, when the vehicle-related entity name is included in the user's speech.

19. The speech recognition system for the vehicle of claim 11, wherein the trained domain classification model comprises an area classification model that classifies a result of sentence embedding of the text, converted from the user's speech, into a vehicle area or another area within an embedding space, and
wherein the domain classification module is configured to classify the user's speech into the external domain, when the result of sentence embedding of the text is not included in the vehicle area.

* * * * *